(12) United States Patent
Bryon et al.

(10) Patent No.: US 8,768,133 B2
(45) Date of Patent: Jul. 1, 2014

(54) HOUSING FOR AN OPTICAL FIBER ASSEMBLY

(75) Inventors: Roel Modest Willy Bryon, Aarschot (BE); Kristof Vastmans, Boutersem (BE); Danny Willy August Verheyden, Geirode (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 245 days.

(21) Appl. No.: 13/148,644

(22) PCT Filed: Feb. 5, 2010

(86) PCT No.: PCT/EP2010/051429
§ 371 (c)(1),
(2), (4) Date: Nov. 10, 2011

(87) PCT Pub. No.: WO2010/092008
PCT Pub. Date: Aug. 19, 2010

(65) Prior Publication Data
US 2012/0057835 A1    Mar. 8, 2012

(30) Foreign Application Priority Data
Feb. 10, 2009   (EP) .................................. 090018193

(51) Int. Cl.
*G02B 6/44*        (2006.01)
(52) U.S. Cl.
USPC ......................................................... 385/135
(58) Field of Classification Search
USPC ................................................ 385/134–135
See application file for complete search history.

(56) References Cited

U.S. PATENT DOCUMENTS

| | | | | |
|---|---|---|---|---|
| 4,717,231 A * | 1/1988 | Dewez et al. | ................. | 385/135 |
| 5,790,741 A * | 8/1998 | Vincent et al. | ................ | 385/135 |
| 5,802,237 A * | 9/1998 | Pulido | ........................... | 385/135 |
| 6,249,633 B1 * | 6/2001 | Wittmeier et al. | ............ | 385/135 |
| 6,504,987 B1 * | 1/2003 | Macken et al. | ................ | 385/135 |
| 6,539,160 B2 * | 3/2003 | Battey et al. | ................. | 385/135 |
| 6,621,975 B2 * | 9/2003 | Laporte et al. | ............... | 385/135 |
| 6,738,554 B2 * | 5/2004 | Daoud et al. | ................. | 385/135 |

(Continued)

FOREIGN PATENT DOCUMENTS

| | | |
|---|---|---|
| EP | 0744640 A1 | 11/1996 |
| EP | 1316829 A2 | 6/2003 |
| WO | WO 98/48308 | 10/1998 |
| WO | WO 00/28365 | 5/2000 |

OTHER PUBLICATIONS

International Search Report and Written Opinion issued by the European Patent Office, dated May 3, 2010, for PCT/EP2010/051429; 13 pages.

(Continued)

*Primary Examiner* — Daniel Petkovsek
(74) *Attorney, Agent, or Firm* — Faegre Baker Daniels LLP

(57) ABSTRACT

The present invention relates to a housing for an optical fiber assembly allowing compact storage of optical fiber elements while still providing possibility to efficiently splice individual optical fiber elements. The housing of the invention is adapted to receive a first and a second loop of an optical cable and includes a first set of guiding means defining a first plane for receiving the first loop and a second set of guiding means defining a second plane for receiving the second loop. The planes are under a substantial angle.

17 Claims, 6 Drawing Sheets

(56) References Cited

U.S. PATENT DOCUMENTS

| | | | |
|---|---|---|---|
| 7,330,627 B2* | 2/2008 | Mullaney et al. | 385/135 |
| 7,340,145 B2* | 3/2008 | Allen | 385/135 |
| 7,596,293 B2* | 9/2009 | Isenhour et al. | 385/134 |
| 8,009,954 B2* | 8/2011 | Bran de Leon et al. | 385/135 |
| 8,467,651 B2* | 6/2013 | Cao et al. | 385/135 |
| 8,472,772 B2* | 6/2013 | Griffiths et al. | 385/135 |

OTHER PUBLICATIONS

European Search Report issued by the European Patent Office, dated Aug. 4, 2009, for EP09001819; 7 pages.

International Preliminary Report on Patentability, issued by the International Bureau of WIPO, Geneva, Switzerland, dated Aug. 16, 2011, for related International Application No. PCT/EP2010/051429; 7 pages.

* cited by examiner

HOUSING FOR AN OPTICAL FIBER ASSEMBLY

The present invention relates to a housing of an optical fiber assembly for an optical cable composed of plural optical fiber elements. When connecting a user to an optical cable, it is quite common that only a few or even one optical fiber element of the optical cable needs to be spliced in order to be connected to the user. In such a case, the majority of optical fiber elements comprise in the optical cable, could pass through a housing providing a protection and sealing for the at least one splice without alteration. However, for splicing single or plural optical fiber elements, some length of said optical fiber elements has to be available as such. Accordingly, a jacket surrounding the selected optical fiber element, on a general basis surrounding grouped optical fiber elements needs to be removed to obtain a respective length of optical fiber without a jacket.

In the case plural groups of optical fiber elements, each of them being surrounded by a separate jacket, are comprised in a single optical cable, the same will usually be likewise surrounded by a cable jacket. For providing access to one of those fiber elements, the optical cable jacket will need to be removed. Further, the jacket around one group of optical fiber elements needs to be removed in order to access the one separated or plural separated optical fiber elements to access those.

When connecting the separated optical fiber elements, sufficient length of those optical fiber elements has to be cut free from the jacket. As all optical fiber elements form part of the single optical cable, the remaining optical fiber elements or grouped optical fiber elements will be available with respective length at the splice of the separated optical fiber element.

On a general basis, those remaining optical fiber elements will form a second loop which is received within the housing. As mentioned above, the at least one selected optical fiber element after connecting with a splice will be wound on the first loop. Both loops are to be retained in the housing.

EP 0 717 862 discloses an optical fiber assembly having a housing and at least one splice provided for an optical fiber element which is separated from the remaining optical fiber elements of said optical cable. This separated optical fiber element forms a first loop. Further, there is provided a second loop within the housing which is formed by remaining optical fiber elements.

These remaining optical fiber elements may comprise all optical fiber elements of the optical cable, except the separated optical fiber element(s) or parts of the remaining optical fiber elements except the separated fiber element(s) with further fiber elements of the cable being e.g. passed to the outside of the housing or stored in further loops. In the optical fiber assembly of EP 0 717 862 the first loop of separated optical fiber elements is retained in a tray providing a splice accommodation section adapted to receive at least one splice. Other optical fiber elements of the optical cable are retained in other trays each of them forming second loops.

In order to provide a compact optical fiber assembly which also provides the opportunity to separately store the first and the second loops within the housing, the present invention provides a housing as defined in claim 1. In this housing, both loops can be accommodated in such a way, that they each extend in planes, which planes are under a substantial angle. The substantial angle is preferably between 40° and 90°, most preferably between 60° and 90°, wherein a perpendicular arrangement of both loops has turned out to provide a most compact way of storing the two loops within the housing.

Such arrangement provides the opportunity, to store the first and the second loop in a fairly dense but well organized manner within the housing. On a regular basis, the second loop of remaining optical fiber elements will form the inner loop while the first loop encircles this second loop of remaining optical fiber elements. The one or more separated optical fiber elements can be provided within the housing with their respective ends connected to a line-out optical cable. The remaining length of said line-out optical cable and/or said separated optical fiber element(s) may form part of the first loop. The separated optical fiber element as well as the line-out optical cable can be arranged within the housing without crossing or intersecting with remaining optical fiber elements or groups of such optical fiber elements.

With the present invention, a housing is provided, in which the remaining optical fiber elements can form a second loop which will not be interfered with in the case of connecting the at least one separated optical fiber element with a line-out optical cable by means of a splice. Such connection work will be performed only within the one or more optical fiber elements which have been separated, i.e. split from the optical cable. These separated optical fiber elements are passed to a first loop receiving section in which said separated optical fiber elements can be worked without interfering with the remaining optical fiber elements of the second loop.

The housing provides a first and a second set of guide means. The first set of guide means are adapted to receive the first loop; the second set of guide means are adapted to receive the second loop in such a way that the two loops are received in the respective planes. As guide means all means are applicable which are suitable to store and hold the respective loops within the housing. With the above described preferred realization of the inventions, a very compact storage of both loops within the housing can be attained.

Preferably, the first and the second set of guide means of the provided within the housing are arranged such, that the loops are contained within planes which interact with each other at a position essentially corresponding to the largest extension of both loops. The second set of guide means is preferably arranged such that the second loop is preferably arranged in the center of the first loop. With this preferred embodiment, the first loop is arranged approximately at one half of the height of the second loop and is encircling the second loop. Further preferred embodiments of the present invention are defined in the dependent claims.

The present invention furthermore proposes an optical fiber assembly of an optical cable composed of plural optical fiber elements. Said optical fiber assembly comprises at least one spliced optical fiber element which is separated from the remaining optical fiber elements of the optical cable and forms a first loop while all or a part of the remaining optical fiber elements form at least one second loop. According to the invention, the first and the second loops are accommodated in a housing in such a way that they extend in planes, wherein these planes are under a substantial angle.

In a preferred embodiment, this optical fiber assembly comprises a housing as defined in any of claims 1 through 15.

The present invention will now be described in further detail by referring to a preferred embodiment depicted in the accompanying drawings. In these drawings.

Figure 1:
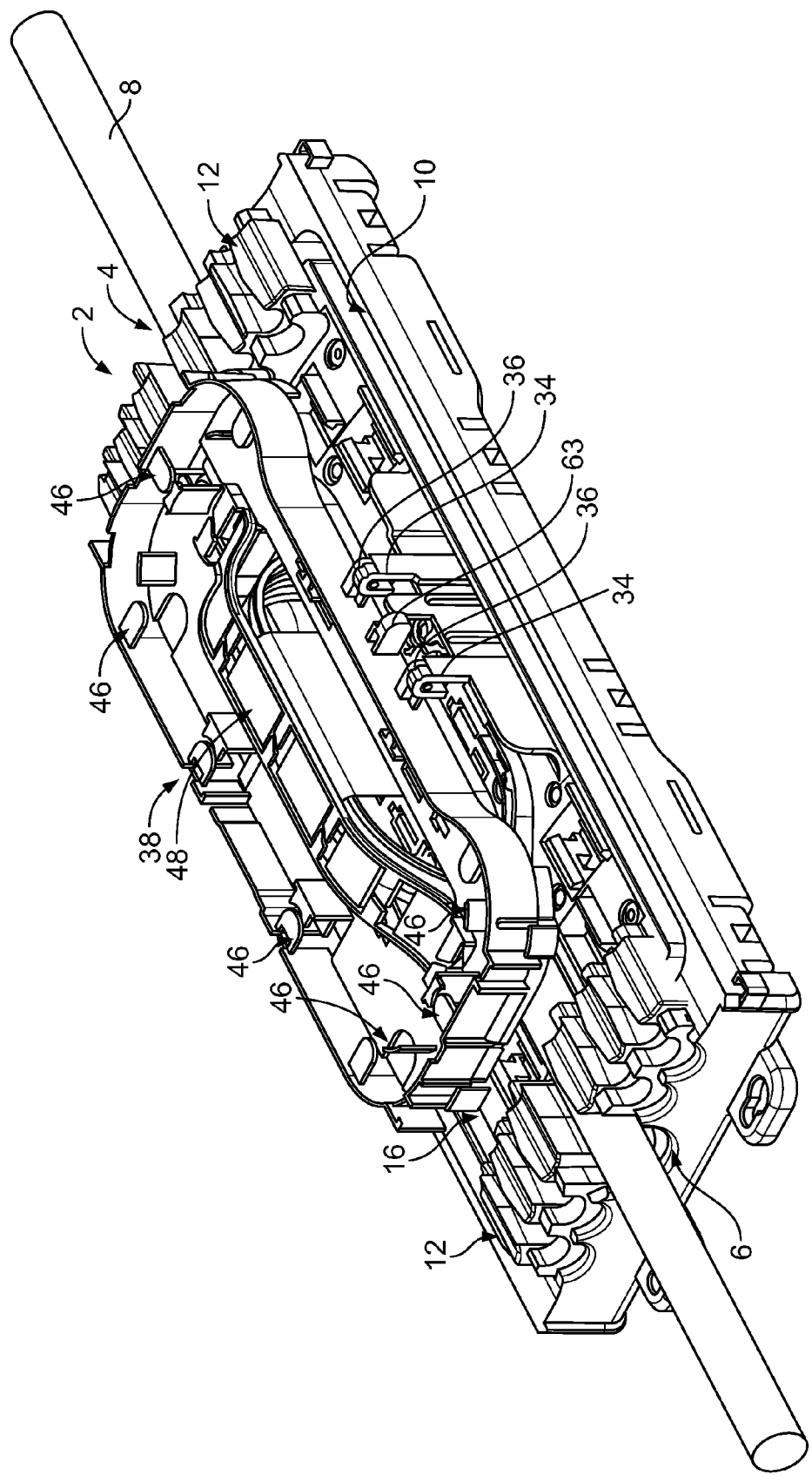
FIG. 1 Shows a perspective top view of the embodiment.

FIG. 1 shows a perspective top view of a housing lower body generally identified with reference numeral 2 providing first and second ports 4, 6, for an optical cable 8 which is received within the housing being composed of the shown housing lower body 2 and a housing upper body 3, which is adapted to form a sealed housing in cooperation with the housing lower body 2. Usually, both housings receive one or more sealing elements made of e.g. gel, rubber, mastic or a pressure sensitive adhesive which are adapted to pass the optical cable 8 through the port 4, 6. For this, the housing lower body 2 has a longitudinal seal grove 10, which extends parallel to the longitudinal extension of the housing lower body 2 and is provided at a lateral edge thereof. Further, there are provided gel sealing elements 12 at the transverse sides of the housing lower body 2, each of said gel sealing elements 12 providing for the ports 6, 8 for the optical fiber 8 and sealing the optical fiber 8 against an inner space provided by the housing.

Figure 3:
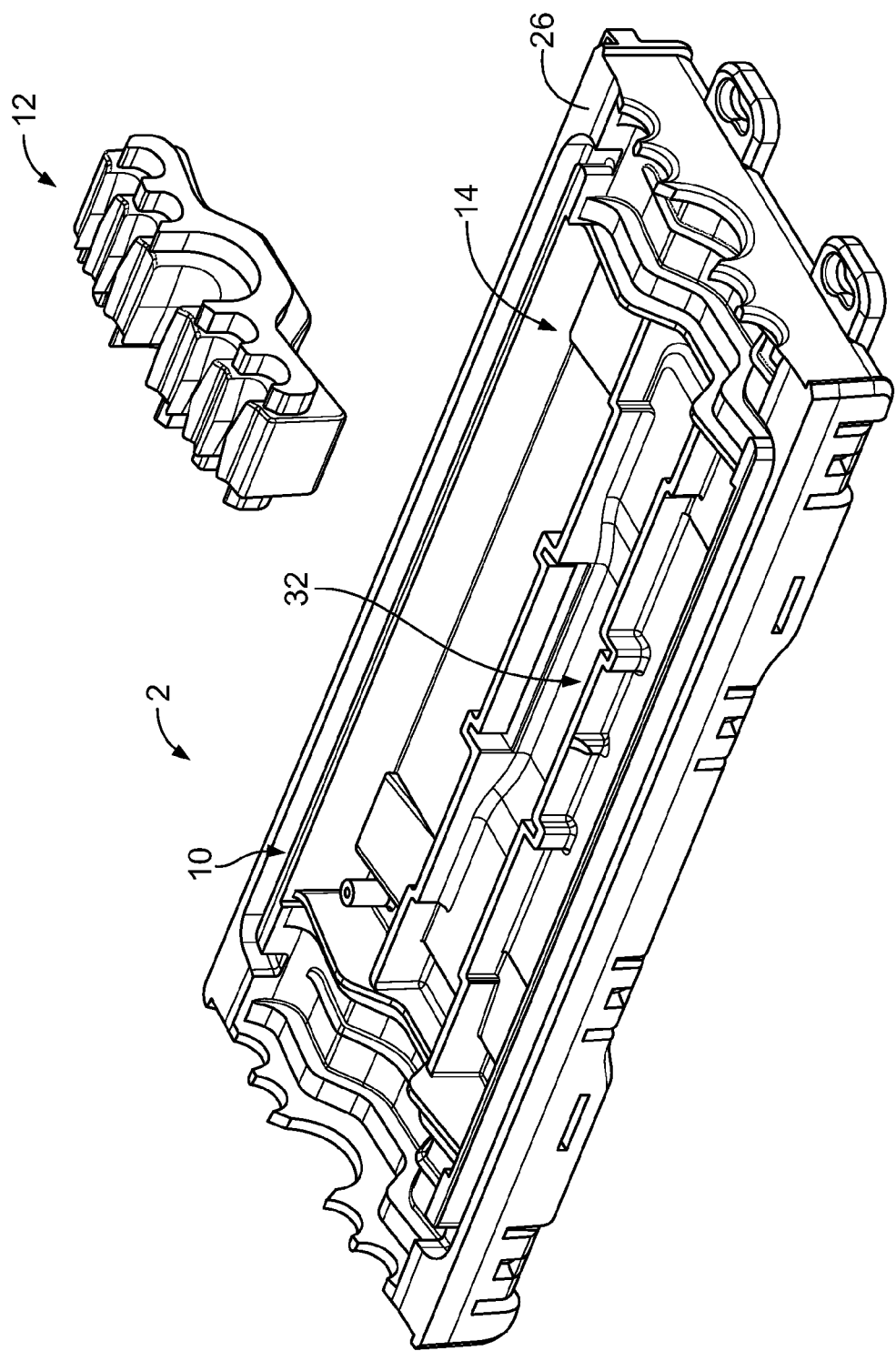
FIG. 3 Shows a perspective top view of the housing lower body without insert element, FIG. 4 Shows a cross-sectional view along line IV-IV according to FIG. 1, and FIG. 5 schematically shows the arrangement of both loops relative to each other.

As evident from FIG. 3, the housing lower body 2 provides an insert receiving recess 14 for receiving an insert element generally identified with reference numeral 16. Said insert element provides optical cable retention sections 18 for receiving the entire optical cable 8 and fixing said optical cable 8 to said insert element 16. This fixing can be attained e.g. by a generally known cable binder securing the optical cable 8 against the insert element 16.

Inwardly of said optical cable retention sections 18, a cable jacket 20 surrounding the optical cable 8 and forming the outer surface thereof is removed thereby making groups of optical fiber elements generally denoted with reference numeral 22 available. These groups 22 of optical fiber elements have a total length of plural the distance between the opposing ends of the cable jacket 20. This entire length of these groups 22 of optical fiber elements is retained in a second loop 22, which is arranged essentially perpendicular to the parting plane of the housing between both bodies of a closed housing. This parting plane/top face of housing lower body 2 is identified with reference numeral 26 and essentially corresponds to the upper lateral surface of housing lower body 2.

Figure 4:
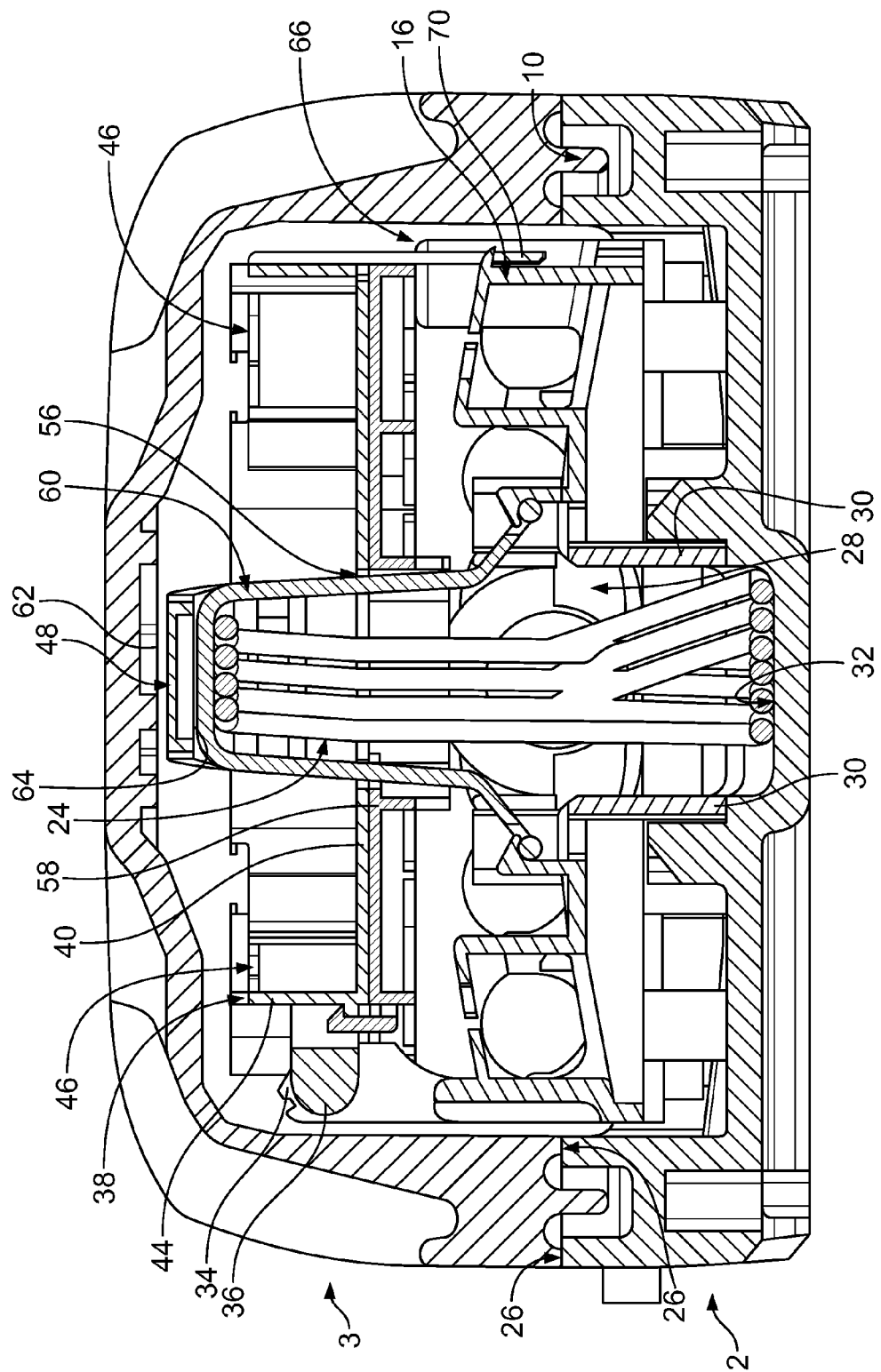

As evident from the sectional view according to FIG. 4, about two thirds of the second loop 24 projects the parting plane 26. The lower one third height of the second loop 24 is received within the housing lower body 2. For this, the insert element 16 has a loop accommodation recess 28, the lateral sides thereof being essentially formed by walls 30 provided by the insert element 16 and the base 32 of which being formed by the bottom of the housing lower body 2 (compare FIG. 3).

Figure 2A:
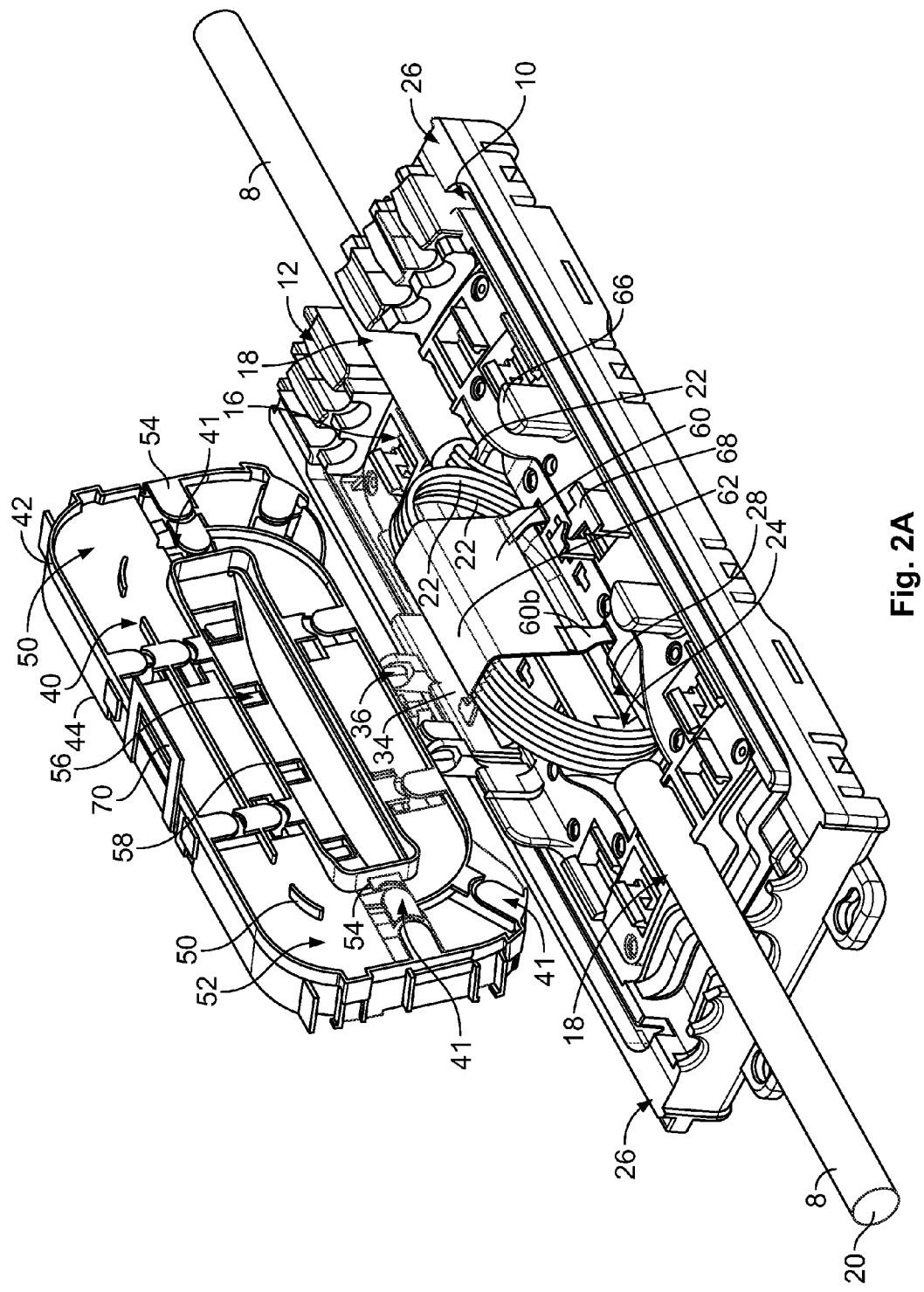
FIG. 2 Shows a top view in accordance with FIG. 1 with the tray tilted away from the housing lower body.
FIG. 2b Shows a top view in accordance with FIG. 1 with the tray removed
Figure 2B:
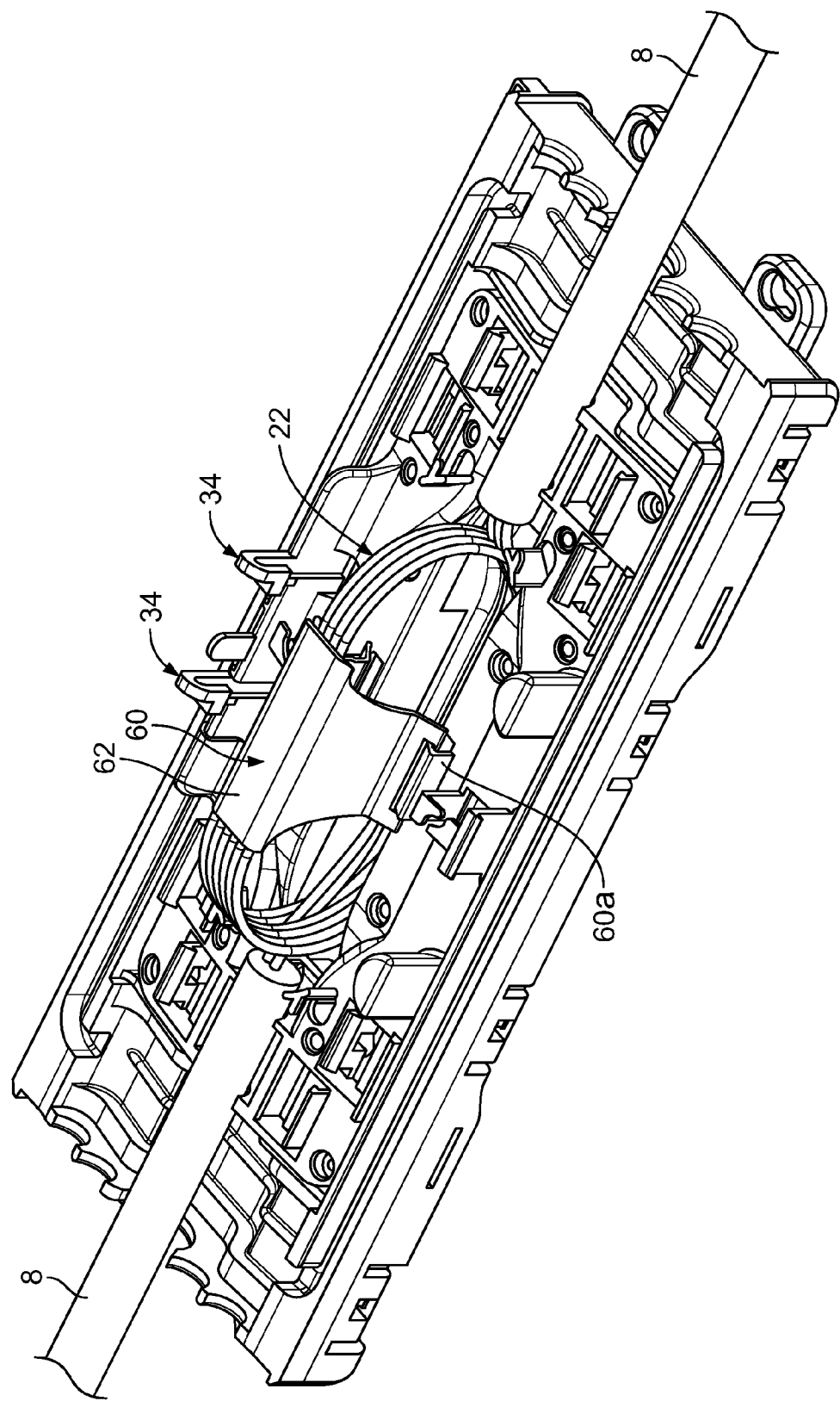

On one lateral side, the insert element 16 provides hinge posts 34, which project the parting plane 26 and cooperate with hinge elements 36 provided by a tray 38 which is pivotably supported by the insert element 16 and thus, by the housing lower body 2 through hinge 34/36 (compare FIG. 2).

The tray 36 comprises a support plate 40, which is projected on both sides by a lower rim 42 and an upper rim 44, respectively and is provided with plural recesses 41 adapted to pass an optical fiber therethrough. As evident from FIG. 1, the tray 36 provides a first loop retaining section 46 provided immediately adjacent to the inner side of upper rim 44. Further, the tray 38 has an arc element 48 which projects the support plate 40 and is arranged at the centre of the tray 38 in a longitudinal extension corresponding to that of the optical cable 8.

On the lower side of the support plate 40 and between the inner face of the lower rim 42 and inner projections 50 there is provided a third loop retaining section 52. In alignment with the optical cable 8, there are provided optical cable abutment means 54 which are adapted to cooperate with the outer circumference of the optical cable 8 and are recessed to allow introduction of a third loop of optical fiber elements into said third loop retaining section 52. The support plate 40 provides a longitudinal recess 56 which is surrounded by a rectangular rim section 58 projecting the lower side of the support plate 40.

As evident from FIG. 2, the second loop 42 with its part projecting the insert element 16 is received within a retaining bracket 60 which is fixed to the insert element 16 by a hinge 60a and snapping elements 60b for securely holding the retaining bracket by snapping. This second loop retaining bracket 60 provides a top face 62 which shields the upper section of the second loop 42. The second loop retaining bracket 60 is adapted to be received within the longitudinal recess 56 of tray 38.

For accessing a single optical fiber element being comprised by a single group of optic fiber elements not shown in the FIGS. 1 to 4, the respective group of optic fiber elements is separated from all other groups 22 of optical fiber elements forming the second loop 22. These separated optical fiber elements which may be covered by an individual jacket, will be stored in the tray 38. On a regular basis, the jacket surrounding this group of optical fiber elements is removed to sufficient length to allow splicing of individual optical fiber elements of the separated group of optical fiber elements. The optical fiber elements among the selected group which will not be connected to another optical fiber cable by means of a splice, will be retained in the third loop retaining section 52, i.e. on the lower part below the supporting plate 40 and opposite to the insert element 16. These separated optical fiber elements which will be connected to an optical cable by means of a splice, will be led to the upper section of tray 38 by pushing those optical fiber elements through one of the recesses 41 provided in the support plate 40.

This assembly is done with the tray 38 held in a position shown in FIG. 2 in which the tray 38 is hinged in an angle of about 100° relative to the partition 26 of the housing lower body 2. In this position, a stop 63 provided on the outer circumference of insert 38 and in a position between the hinge elements 36 will cooperate with a wall projecting from the insert element 16 to secure the position shown in FIG. 2.

After the third loop of the optical fiber elements is retained in the third loop retaining section 52, and selected separated optical fiber elements have been passed through the support plate 40 to the upper side of the tray 38, the same will be pivoted about the hinge 34/36. Thereby, the loop retaining bracket 60 is introduced into the longitudinal recess 56 until the top face 62 of the second loop retaining bracket 60 abuts against an abutment face 64 formed by the arc element 48. In addition, the lower face of the support plate 40 will rest on supports 66 projecting a base portion of the insert element 16 and being formed thereby. Between those supports 66 there is provided a snap element 68 cooperating with a snap bar 70 projecting the lower face of the tray 38. By means of this snapping mechanism 68, 70, the support plate 40 of the tray 38 is secured in a position essentially parallel to the parting plane 26, i.e. to the extension of the optical cable 8. Thus secured and held in place relative to the housing lower body, above said tray 38, a splicing operation can be conducted to connect the selected separated optical fiber element with e.g. a line-out optical cable. After said splicing operation is performed in a well known manner, the separated optical fiber elements provided on the upper side of the tray 38, is formed to provide a first loop and retained in the first loop retaining section 46. Prior to connecting an additional line-out optical cable to the separated optical fiber element, the end of the line-out optical cable can likewise be fed through a recess 41 of the support plate 40 of the tray 38. This is preferably done opposed to the location where the separated optical fiber element(s) is/are fed through the support plate 40. With such an arrangement of separated optical fiber elements and fiber elements of a line-out optical fiber cable on top of the support plate 40, interference and cross-section of the remaining optical fiber elements can be avoided. While those remaining optical fiber elements connected to a line-out optical fiber cable form the second loop 24 and are arranged on the upper side of support plate 40, the other, dead, i.e. not connected optical fiber elements can be retained of the other side of the support plate 40 in the third loop retention section 52. The first loop extends parallel to those two loops in a plane above the level of the optical cable 8.

Figure 5:
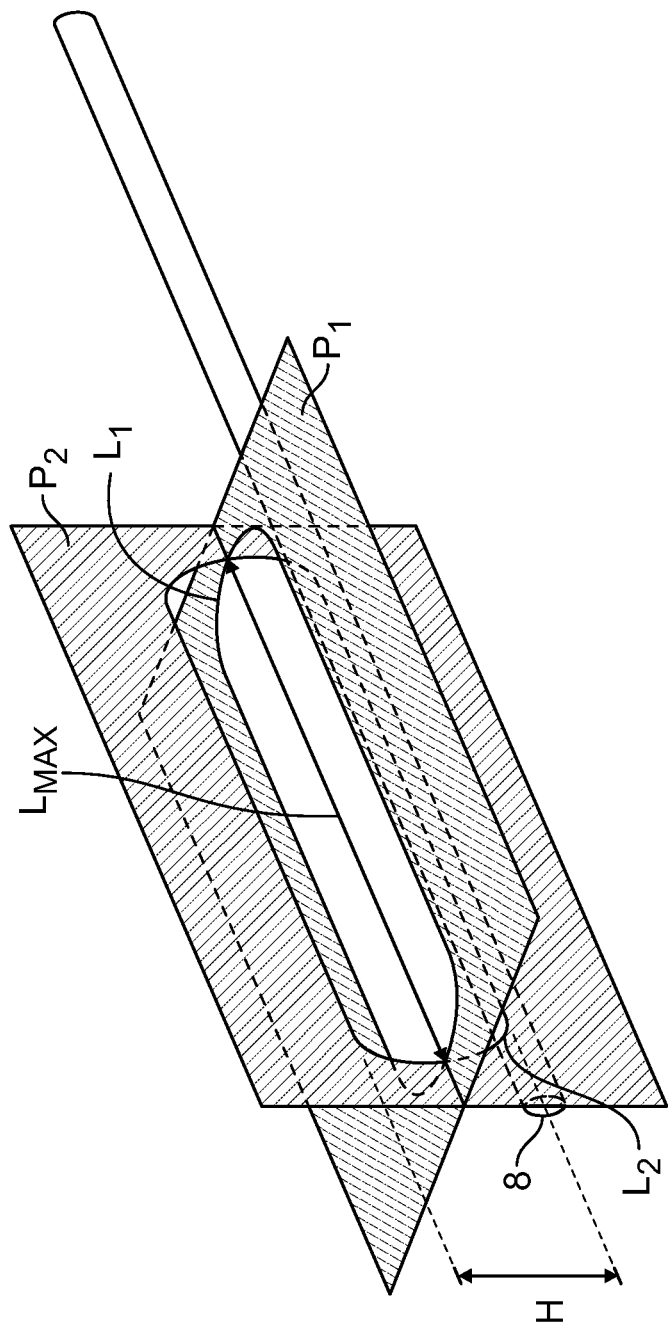

The compact arrangement of all essential elements of the described embodiment of an optical fiber assembly is sketched in the schematic drawing of FIG. 5. Both, loops, L1 and L2 extend in planes which are identified with P1, P2, respectively. For a better understanding of the inventive concept of compact storing of optical fiber elements having different functions within a housing, the following explanations refer to planes and it is assumed that each loop extends in a single plane. As evident e.g. from FIG. 2 and from the general consideration, all loops have an extension perpendicular of a plane in which they extend. This fact should not be denied with the following explanations.

FIG. 5 shows a parallel extension of plane P1 with the extension of optical cable 8. Further, plane P2 likewise extends parallel to the longitudinal extension of the optical cable 8. However, the axis of optical cable 8 falls within plane P2. Second loop L2 has a maximum extension $L_{MAX}$ in the direction parallel of the optical cable 8. This maximum length $L_{MAX}$ is contained in plane P1 likewise receiving the first loop L1. The first loop L1 encircles the second loop L2, i.e. is provided around the second loop L2.

While FIG. 5 represents an example of a compact arrangement of both loops, the optical cable can also be arranged essentially concentric to $L_{MAx}$ of the second loop with the plane P1 being arranged eccentric to said optical cable and slightly above $L_{MAX}$. This condition is e.g. realized in the embodiment of FIGS. 1 through 4. Here, the first loop L1 is arranged approximately half way between the optical cable 8 and H/2, with H being the height of the second loop L2 in a plane P2.

The above described arrangement provides ease of accessibility of both, the remaining optical fiber elements providing the second loop L2, 24 as well as the separated optical fiber elements which can be spliced on top of tray 38 in a position depicted in FIG. 2. In the event that optical fiber elements which are separated from the second loop 24 and provided in the third loop retention section 52 are to be spliced to a further line-out optical cable, those further fiber optical fiber elements can likewise be passed through the support plate 40 to provide splices in the above described manner. While not shown in the drawing, there are provided splice retaining sections on the upper side of the support plate 40. Accordingly, once a splice is made, the splicing element can be retained and secured against the tray 38 in a predetermined manner.

After all splicing has been effected, the housing is closed by a housing upper body which will be sealed against the housing lower body 2 by means of the gel sealing element 12 and a lateral sealing element received in each of the seal groves 10. By this, the optical fiber elements of the optical cable 8, which has been made accessible through removal of the cable jacket 20 are hermetically received within the housing.

REFERENCE LIST

L1 first loop
L2 second loop
P1 first plane
P2 second plane
$L_{MAX}$ maximum extension of second loop P2 in a direction parallel to the optical cable 8
H maximum extension of loop L2 in plane P2
2 lower body
3 upper body
4 first port
6 second port
8 optical cable
10 seal grove
12 gel sealing element
14 insert receiving recess
16 insert element
18 optical cable retention sections
20 cable jacket
22 group of optical fiber elements
24 second loop
26 porting plane
28 loop accommodation recess
30 lateral wall
32 base
34 hinge posts
36 hinge elements
38 tray
40 support plate
41 recess
42 lower rim
44 upper rim
46 first loop retention section
48 arc element
50 inner projection
52 third loop retention section
54 optical cable abutment means
56 longitudinal recess
58 rectangular rim
60 second loop retaining bracket
60a hinge
60b snapping elements
62 top face
63 stop
64 abutment face
66 support
68 snap element
70 snap bar.

The invention claimed is:

1. A housing for an optical cable composed of plural optical fiber elements which form a first loop and a second loop, said housing comprising:
   a first set of guiding means defining a first plane for receiving the first loop; and
   a second set of guiding means defining a second plane for receiving the second loop, wherein the planes are angled 40°-90° relative to each other, the first set of guiding means is positioned outwardly from the second set of guiding means such that, in the received state, the first loop encircles the second loop.

2. The housing according to claim 1, wherein the planes are angled between 60° and 90° relative to each other.

3. The housing according to claim 1, further comprising a tray contained within said housing, said tray being adapted to hold the first loop.

4. The housing according to claim 3, wherein said tray has at least one splice accommodation means for housing a splice.

5. The housing according to claim 3, wherein said tray has a longitudinal recess adapted to receive said second loop.

6. The housing according to claim 5, wherein said housing accommodates a second loop retaining bracket which is releasably held by a housing body and which projects through the longitudinal recess.

7. The housing according to claim 5, wherein said tray comprises an arc element which projects above the longitudinal recess and forms an abutment face cooperating with a top face of said second loop retaining bracket.

8. The housing according to claim 3, wherein the housing comprises a housing lower body and a housing upper body enclosing therebetween ports for the optical cable.

9. The housing according to claim 8, wherein said tray is arranged essentially in parallel with the parting plane between the two housing bodies and the ports for the optical cable.

10. The housing according to claim 8, wherein said tray is hinged to said housing lower body such that the tray can be tilted for more than 90° from a position essentially parallel to the parting plane to a position in which said tray projects from said housing lower body in a predetermined manner.

11. The housing according to claim 8, wherein said housing lower body provides a loop accommodation recess for receiving a lower section of said second loop.

12. The housing according to claim 11, wherein said loop accommodation recess is provided by an insert element inserted into said housing lower body.

13. The housing according to claim 11, further comprising a tray being adapted to hold said first loop and comprising a longitudinal recess adapted to be projected by said second loop such that said first and said second loop are held in said housing extending essentially perpendicular to each other.

14. The housing according to claim 1, wherein said first set of guiding means and said second set of guiding means are adapted to hold said first loop encircling said second loop.

15. The housing according to claim 1, wherein said first set of guiding means and said second set of guiding means are adapted to hold said loops such that their planes intersect at a position of maximum extension of both loops.

16. An optical fiber assembly for an optical cable composed of plural optical fiber elements comprising:
   a housing including a first set of guiding means and a second set of guiding means;
   at least one spliced optical fiber element being separated from the remaining optical fiber elements of said optical cable, wherein said at least one separated optical fiber element forms a first loop and wherein remaining optical fiber elements form at least a second loop; and
   wherein both loops are accommodated in said housing in such a way that they each extend in planes, wherein the planes are angled relative to each other, and the first set of guiding means is positioned outwardly from the second set of guiding means such that the first loop encircles the second loop.

17. A housing for an optical cable composed of plural optical fiber elements which form a first loop and a second loop, said housing comprising:
   a first set of guiding means defining a first plane for receiving the first loop; and
   a second set of guiding means defining a second plane for receiving the second loop, wherein the second loop is positioned within an inner diameter of the first loop and is angled 40°-90° relative to the first loop, such that the first loop encircles the second loop.

* * * * *